United States Patent [19]

Saburi

[11] 4,221,501

[45] Sep. 9, 1980

[54] METHOD OF AND SYSTEM FOR UNDERGROUND IRRIGATION

[75] Inventor: Kunio Saburi, Nagaokakyo, Japan

[73] Assignee: World Seiko Kabushiki Kaisha, Nagaokakyo, Japan

[21] Appl. No.: 950,527

[22] Filed: Oct. 11, 1978

[30] Foreign Application Priority Data

Oct. 9, 1977 [JP] Japan ............................... 52-125999
Oct. 19, 1977 [JP] Japan ............................... 52-126000

[51] Int. Cl.³ .............................................. E02B 11/00
[52] U.S. Cl. ....................................... 405/37; 405/36; 239/542
[58] Field of Search ................... 405/37, 36; 239/542, 239/541, 540, 545, 548, 145, 11, 539

[56] References Cited

U.S. PATENT DOCUMENTS

| | | | |
|---|---|---|---|
| 2,730,404 | 1/1956 | Meisinger et al. | 239/542 |
| 3,407,608 | 10/1968 | Whitehead | 405/37 |
| 3,420,064 | 1/1969 | Blass et al. | 239/542 |
| 3,546,884 | 12/1970 | Timpe | 405/37 |
| 3,566,982 | 3/1971 | Share | 405/36 X |
| 3,603,511 | 9/1971 | La Pierre | 239/547 |
| 3,722,539 | 3/1973 | Schmidt | 239/145 X |
| 3,819,118 | 6/1974 | Brock et al. | 239/542 X |
| 3,887,138 | 6/1975 | Gilead | 239/542 |
| 4,037,791 | 7/1977 | Mullett et al. | 239/547 |
| 4,053,109 | 10/1977 | Gilead | 239/542 |

Primary Examiner—Dennis L. Taylor
Attorney, Agent, or Firm—Wenderoth, Lind & Ponack

[57] ABSTRACT

At least one hollow water permeable member is embedded in soil to be irrigated. The water permeable member includes a wall having therein a plurality of fine capillary pores. A supply source of water is maintained at a negative water pressure. A feed pipe connects the supply source of water to the interior of the water permeable member. Water from the supply source passes through the feed pipe to the water permeable member and permeates through the capillary pores into the surrounding soil by means of a pressure difference between the negative water pressure of the supply source and the lower negative pressure within the soil surrounding the water permeable member resulting from the degree of absorptivity of the soil.

4 Claims, 14 Drawing Figures

METHOD OF AND SYSTEM FOR UNDERGROUND IRRIGATION

BACKGROUND OF THE INVENTION

The present invention relates to a method of and a system for underground irrigation, and more particularly to such method and system which enable constant supplying of water in the amount required by cultivated plants to their root portions without waste of water.

In order to irrigate various plants such as crops, flowers and fruits, it has been a common practice to install a number of sprinklers over the cultivation field to sprinkle water from above the soil. Though this method has been satisfactory in its simpleness of installation, use and maintenance, it also has some drawbacks in that it requires an extremely large amount of water to sufficiently dampen the cultivation soil to thereby supply a sufficient amount of water to the roots of the cultivated plants, because water is sprinkled over a wide area including the portions of the land where the dampening is not required and because the loss of water by evaporation is large, and that the sprinkling of water during the time of flowering of the plants affects the fructification of the cultivated plants. The waste of water as stated above is against the effective use of the water resources and should be eliminated as much as possible.

In view of the aboves, in order to dampen only the necessary portion of the soil with a smaller amount of water, a drip irrigation system has been developed. This irrigation system comprises a water feed pipe connected to a water supply source and installed on the ground and drip units suitably connected to the water feed pipe. According to this system, water may be supplied only to desired places so that waste of water is reduced. This irrigation system, however, has also a drawback that the evaporation of water is inavoidable because the water is supplied from above the land so that more water than required by the cultivated plants has to be dripped from each drip unit. Furthermore, the amount of water dripped from the drip units located far from the water supply source is smaller than that dripped only from the drip units located closer to the water supply source since the water pressure in the water feed pipe drops toward the remote end of the pipe. Therefore, if the water pressure is increased to sufficiently dampen the soil far from the water supply source, the soil close to the water supply source is excessively dampened. This results in waste of water and also affects the desired growth and quality of the cultivated plants. Furthermore, since the dripping units, generally, are placed on the cultivation soil, it often happens that the earth, fertilizer and other matters adhere to the water outlet of the dripping unit to clog the same, resulting in under-feed of water. Still further, since the stem and leaves of the cultivated plant are wet by the water as dripped from the drip unit and are normally placed in an environment of high humidity caused by the evaporation of water, the propagation of bacteria is promoted so that the growth of the cultivated plant is considerably retarded and sometimes the plants are withered. Furthermore, the drip irrigation system requires pump means to drip water from the drip units.

SUMMARY OF THE INVENTION

In view of the foregoing, it is a general object of the present invention to provide a method of and a system for underground irrigation, which eliminate various drawbacks of the prior art.

A more specific object of the present invention is to provide a method of and a system for underground irrigation, which enable constant supplying of water in the amount required by cultivated plants to their root portions without waste of water.

Another object of the present invention is to provide a method of and a system for underground irrigation, which enable constant and even or uniform supplying of water over a broad cultivation field.

A further object of the present invention is to provide a method of and a system for underground irrigation wherein the problem of clogging of a drip unit is eliminated.

A still further object of the present invention is to provide a method of and a system for underground irrigation wherein the stem and the leaves of the cultivated plant are not rendered wet by the supplied water and are not placed in an environment of high humidity so that the propagation of bacteria is greatly suppressed.

A still further object of the invention is to provide a method of and a system for underground irrigation wherein power units such as pump means are not required to feed water.

According to the present invention, there is provided a method of underground irrigation, comprising embedding at least one hollow water permeable member having a number of fine capillary pores in the cultivation soil, and supplying water into the hollow water permeable member to permeate the water from inside to outside the hollow water permeable member through its porous wall.

According to the present invention, there is further provided an underground irrigation system, comprising a water supply source, at least one water feed pipe connected to the water supply source, at least one hollow water permeable member having a number of fine capillary pores, and the hollow water permeable member being communicated with the water feed pipe and embedded in the cultivation soil.

BRIEF DESCRIPTION OF THE DRAWINGS

These and other objects and features of the present invention will be better understood upon consideration of the following detailed description and the accompanying drawings in which.

DETAILED DESCRIPTION OF THE INVENTION

Figure 1:
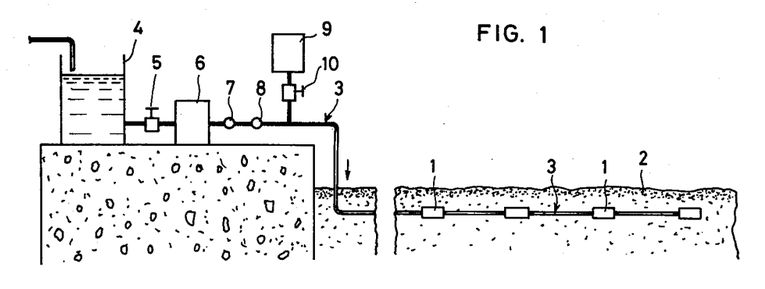
FIG. 1 is a schematic sectional view showing an embodiment of the present invention.
Figure 2:
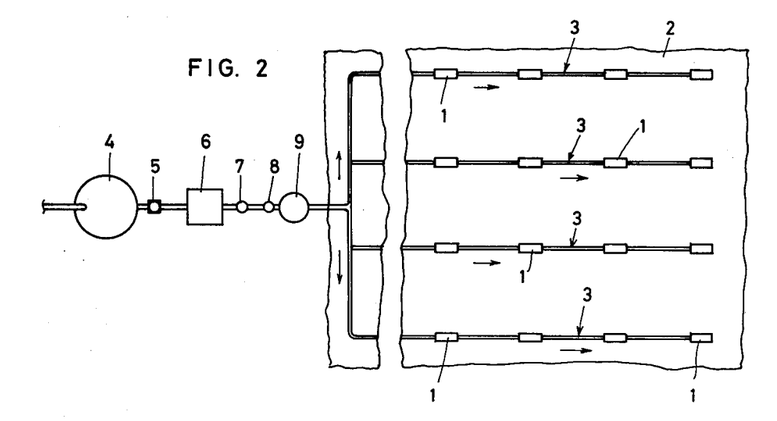
FIG. 2 is a schematic plan view of FIG. 1.

Referring now to the drawings, and more particularly to FIGS. 1 and 2, there is schematically shown an embodiment of the present invention.

The basic or characteristic feature of the present invention resides in that at least one hollow water permeable member 1 having a number of fine capillary pores is embedded in the cultivation soil 2, and water is supplied to the member 1 through a water feed pipe 3 which is connected to a suitable water supply source 4. In this embodiment, the water feed pipe 3 is also embedded in the cultivation soil 2 and is connected to the water supply source 4 through a flow rate control valve 5, a filter 6, a pressure gauge 7, and a flow meter 8. 9 is a liquid fertilizer tank which is connected to the water feed pipe 3 through a mixing ratio adjustment valve 10. In this embodiment, a plurality of water feed pipes 3 extend from a common water supply source 4 and a plurality of hollow water permeable members 1 are associated with each water feed pipe 3. The remote ends of the water feed pipes 3 are closed.

The hollow water permeable member may comprise, for instance, a biscuit ware having a water absorption capability of 10-20% and a porosity of 20-40%, which is produced by baking or firing, at a high temperature of about 1200°-1600° C., a shaped mullite material. Alternatively, the hollow water permeable member may comprise a biscuit ware which is produced by baking or firing, at a high temperature of about 1200°-1600° C., a shaped mixture containing clay as a main component and minute plastic powder uniformly distributed therein. When baked or fired, the plastic powder is volatized and a number of extremely fine capillary pores which are invisible to the naked eye are produced and distributed over the entire biscuit ware. Further alternatively, the hollow water permeable member may be formed by porous stainless steel plate or Monel metal ceramics.

Such hollow water permeable member 1 does not allow the water inside it to freely flow out through its wall without a pressure difference between inside and outside the member, while when the water pressure in the member 1 is higher than the pressure outside it or when the pressure outside the member 1 is lower than that inside the member 1, the water inside the member 1 is allowed to gradually permeate through the wall of the member 1. Generally, the cultivation soil 2, when not saturated with moisture, is normally under underpressure and is liquid absorptive. Thus, the soil 2 around the embedded member 1 is normally absorptive so that the water inside the member 1 spontaneously permeates through the wall thereof into the soil. As such permeated water is absorbed by the cultivated plants, the soil 2 again becomes more dry and is at an underpressure so that the water inside the member 1 is again allowed to gradually permeate through the wall thereof to dampen the soil around the member 1. Such operation continues constantly. Furthermore, since the amount of water supplied to the soil from each member 1 depends on the water absorptivity of the soil, much water is spontaneously fed to these plants which require much water, and also in sunny or fast drying places more water permeates through the member 1 as compared with other places so that supplying of the required amount of water for the cultivation of plants is constantly maintained over the entire cultivation field without over-feed or under-feed.

Figure 3:
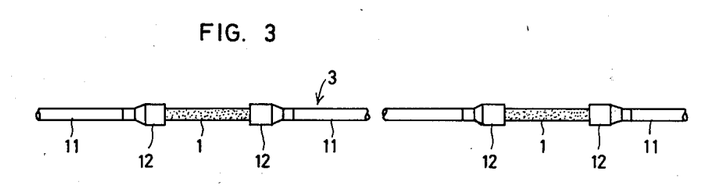
FIG. 3 is a side elevational view showing a possible construction of a water feed pipe as used in the present invention.
Figure 4:
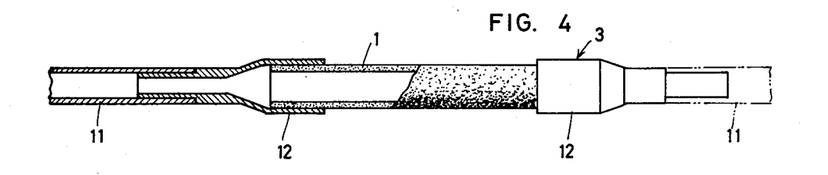
FIG. 4 is an enlarged partial sectional view of FIG. 3.

The water permeable members 1 may be inserted in the water feed pipe 3 for instance as shown in FIGS. 3 and 4. In this arrangement, a plurality of water feed pipe sectons 11 are prepared and the opposite ends of the hollow water permeable member 1 are connected to the adjacent water feed pipe sectons 11 through short coupling tubes 12. Each tube 12 is sealingly connected to the pipe section 11 and to the hollow water permeable member 1. All such connections may be effected in situ and the water feed pipe 3 may be extended while being embedded in the soil 2. Otherwise, the tubes 12 may be preassembled to the opposite ends of each member 1.

In order that the water feed pipe may stand or bear an earthquake or a load passing over it, it is desirable that the water feed pipe sections 11 and/or the coupling tubes 12 are made of flexible material such as plastic.

In operation, and initially when the water feed pipe 3 is empty, the liquid fertilizer tank 9 is filled with water and the valve 10 is fully opened to rapidly fill the water through entire water feed pipes 3. The tank 9 is effective for such rapid filling of the pipes 3 because it is located at a higher level than the water supply source 4. At this time, the valve 5 also may be opened. When the pipes 3 are fully filled with water, the operator will observe a rapid pressure rise in the pressure gauge 7. Then he will close the valve 10 and adjust the valve 5 to provide a suitable flow rate of water and hence a suitable water pressure in the pipes 3. He will also replace the water in the tank 9 by a suitable liquid fertilizer and adjust the valve 10 to introduce a desired amount of liquid fertilizer into the water as flowing in the pipe 3.

The water in the water feed pipes 3 and hence the water in the hollow water permeable members 1 will permeate through the walls of the members 1 into the soil 2 by the pressure difference between the inside and the outside of the members 1. Initially the soil 2 will be dry and absorb much water so that the operator will observe some pressure decrease in the pressure gauge 7. If he wants to sufficiently dampen the soil 2 rapidly he will again adjust the valve 5 to supply more water into the pipe 3. After the soil 2 has been sufficiently dampened the valve 5 will be again adjusted to provide a flow rate which conforms with the amount of water required by the cultivated plants.

Figure 5:
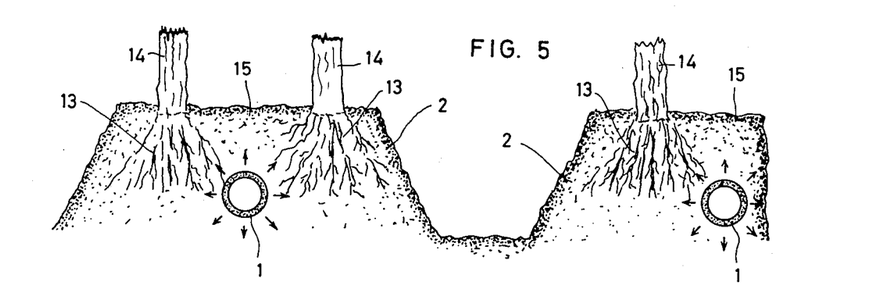
FIG. 5 is a sectional view showing a possible location of water permeable members used in the present invention relative to the roots of cultivated plants.
Figure 6:
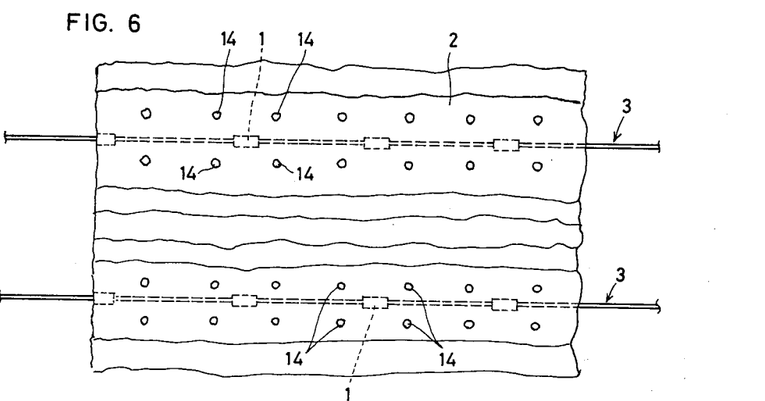
FIG. 6 is a plan view also showing a possible location of the water permeable members relative to the stems of the cultivated plants.

The position and depth of the hollow water permeable members 1 in the soil 2 relative to the cultivated plants are determined according to the kind of the plants and the depth of the roots of the plants. A typical manner of embedding of the members 1 is shown in FIGS. 5 and 6. Generally, it is preferred that the members 1 are embedded in the soil 2 in such way that about the upper half of the member 1 is located within the vertical range of the roots 13 of the plants 14 as shown in FIG. 5. The depth of the members 1 from the soil surface 15, for instance in the case of tomato or cucumber plants, may be 20–30 cm., and one member 1 may be provided for four stems of such plants in the central portion thereof as shown in FIG. 6. For quality or high-grade plants such as melons, it is preferable that one member 1 is provided for each stem of such a plant.

As will be noted from the above, according to the present invention, water permeates from the hollow water permeable members 1 each having a number of fine capillary pores and embedded in the cultivation soil 2 adjacent to the roots of the cultivated plants. Thus, the evaporation of water is substantially negligible and substantially only an amount of water required by the plants is supplied to the soil, and therefore, the waste of water is minimized. The stem and leaves of the cultivated plants are not wet by the supplied water and the evaporation of water is negligible so that the propagation of bacteria is suppressed. When the cultivated plants are changed, the hollow water permeable members may be replaced by those having water permeability which is well suited to the newly cultivated plants.

The water pressure in the water feed pipe 3 decreases toward the remote end thereof due to the hydraulic resistance of the pipe 3. Such pressure drop is not desirable for the even or uniform supplying of water from the water permeable members 1. The axial flow of water adjacent to the inner wall of the hollow water permeable member 1 is also not desirable since it may disturb the proper permeation of water through the wall of the member 1. The embodiment shown in FIGS. 7 and 8 will eliminate such inconveniences.

Figure 7:
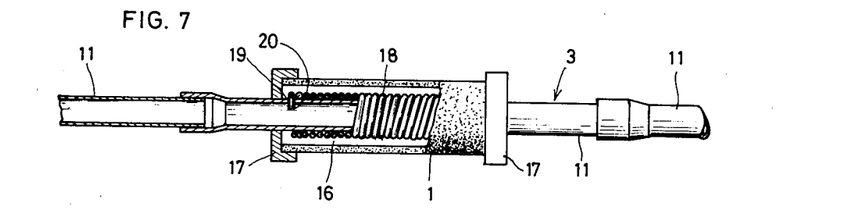
FIG. 7 is a partial sectional side elevational view showing another possible construction of the water feed pipe having the water permeable member mounted thereon.
Figure 8:
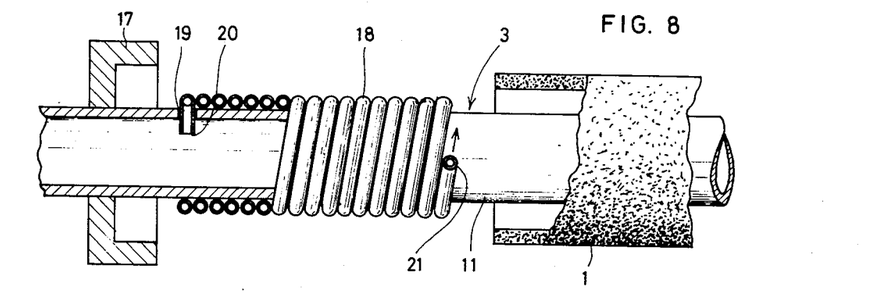
FIG. 8 is an enlarged partial sectional view of FIG. 7, wherein the water permeable tube is separated from its end closure member.

In the embodiment of FIGS. 7 and 8, the water feed pipe 3 again comprises a plurality of pipe sections 11. This embodiment, however, is different from that of FIGS. 3 and 4 in that the hollow water permeable members 1 do not constitute a part of the pipe 3. Instead, the member 1 is coaxially mounted on a suitable pipe section 11 with a space 16 being left between the outer surface of the pipe section 11 and the inner surface of the member 1 and the opposite ends of such tubular member 1 are sealingly closed by closure members 17. In space 16 there is arranged a thin flexible tube 18, and the pipe section 11 is formed with a small bore 19 through which one end 20 of the tube 18 extends into the pipe section 11. The other end 21 of the tube 18 opens into space 16. Favorably, the tube 18 is coiled around the pipe section 11. A plurality of such pipe sections 11 each having a member 1 mounted thereon may be connected in series with or without interposing plain pipe sections therebetween.

The water in the water feed pipe 3 is delivered into space 16 through the tube 18 and is filled in the space 16. The water filled in the space 16 gradually permeates through the wall of the member 1 into the surrounding soil. Since the water in the space 16 is substantially stationary and does not flow axially the permeation of water through the wall of the member 1 is not disturbed.

In order to equalize the water pressure in a plurality of water permeable members 1 as mounted at intervals along the water feed pipe 3, according to the present invention, the hydraulic resistance of the tubes 18 is made successively smaller in proportion to the distance between the water supply source and the locations of the tubes 18. This may be accomplished by making the number of turns of the coils of the tubes 18 larger for those located closer to the water supply source and smaller for those located more remote from the water supply source, or by making the inner diameter of the tubes 18 smaller for those located closer to the water supply source and larger for those located more remote from the water supply source. Thus, the water permeation is made uniform or equalized through a plurality of water permeable members 1 mounted along the water feed pipe 3.

The water permeable member 1 and the tube 18 may be preassembled with the pipe section 11, and such pipe section 11 may be connected in situ to the adjacent similar pipe section 11 having mounted thereon the member 1 with or without interposing plain a pipe section or sections 11 therebetween. Otherwise, the members 1 and tubes 18 may be preassembled on a single long water feed pipe 3.

Figure 9:
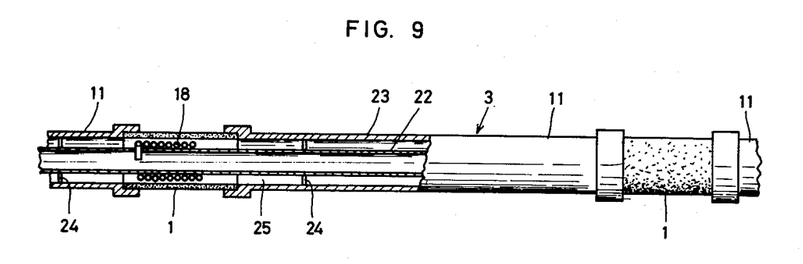
FIG. 9 is a partial sectional view showing still other possible construction of the water feed pipe.

When it is required to install the underground irrigation system according to the present invention over a large cultivation field extending from a particular water supply source, a double wall water feed pipe 3 as shown in FIG. 9 may be used.

The water feed pipe 3 of FIG. 9 comprises an inner pipe 22 and an outer pipe 23. The inner pipe 22 is supported from the outer pipe 23 by suitable support members 24 and connected to the water supply source. A plurality of hollow water permeable members 1 are inserted at suitable intervals in the outer pipe 23, and between the inner and outer pipes 22 and 23 there are arranged a plurality of thin flexible tubes 18 also at suitable intervals. One end of each tube 18 extends into the inner pipe 22 and the other end opens into the space 25 between the inner and outer pipes 22 and 23. The water in the inner pipe 22 is delivered into space 25 through each tube 18 and is filled in the space 25. The water in the space 25 gradually permeates through the members 1 into the surrounding soil. The tubes 18 may be coiled around the inner pipe 22 similarly to FIGS. 7 and 8, and the number of turns may be varied as hereinbefore described. With this arrangement, by supplying water under pressure into the inner pipe 22, it becomes possible to feed the water to locations considerably remote from the water supply source.

Figure 10:
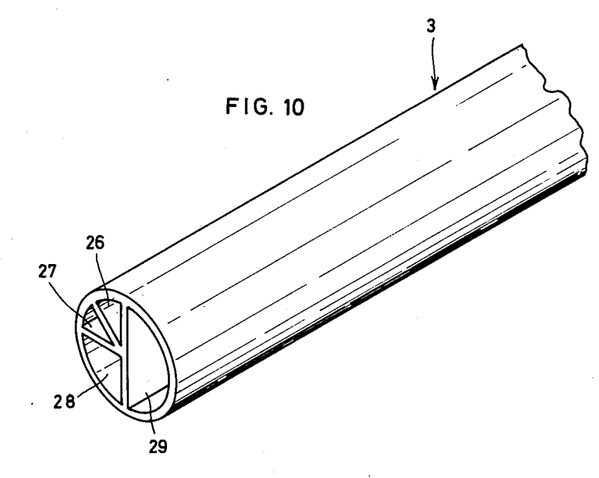
FIG. 10 is a perspective view of a still further possible construction of the water feed pipe.

It is also possible to use a water feed pipe as shown in FIG. 10. This water feed pipe 3 is internally divided into a plurality of water channels 26, 27, 28 and 29 of different cross-sectional areas, and to the group of water permeable members 1 or to a single such member 1 closest to the water supply source water is supplied from the water channel 26 of the smallest cross-sectional area. For the more remote members 1 the water channels 27, 28 and 29 are used successively. The water channel 29 is used, of course, to supply water to the more remote group of members 1 or to the more remote single member 1 as the case may be.

When the water feed pipe 3 of FIG. 10 is used, the water permeable members 1 may be arranged in the manner shown in FIGS. 7 and 8 or in FIG. 9, and water supply to the members 1 may be effected by means of the thin flexible tubes 18 as described above. With this arrangement, the water pressure drop caused by the hydraulic resistance of the pipe 3 is compensated by the difference of cross-sectional areas of the water channels and favorable equalization of the amount of water which permeates through each water permeable member is accomplished. If desired, the water pressure in each water channel may be varied.

The hollow water permeable member as employed in the embodiments as described above are all tubular, and various approximate dimensions of the member may be such that the wall thickness is 5–10 mm., the outer diameter 30–60 mm., and the length 15–30 cm. Such size of member 1 is satisfactory for practical use. The size and shape of the member 1, however, are not limited to such particular dimensions.

Figure 11:
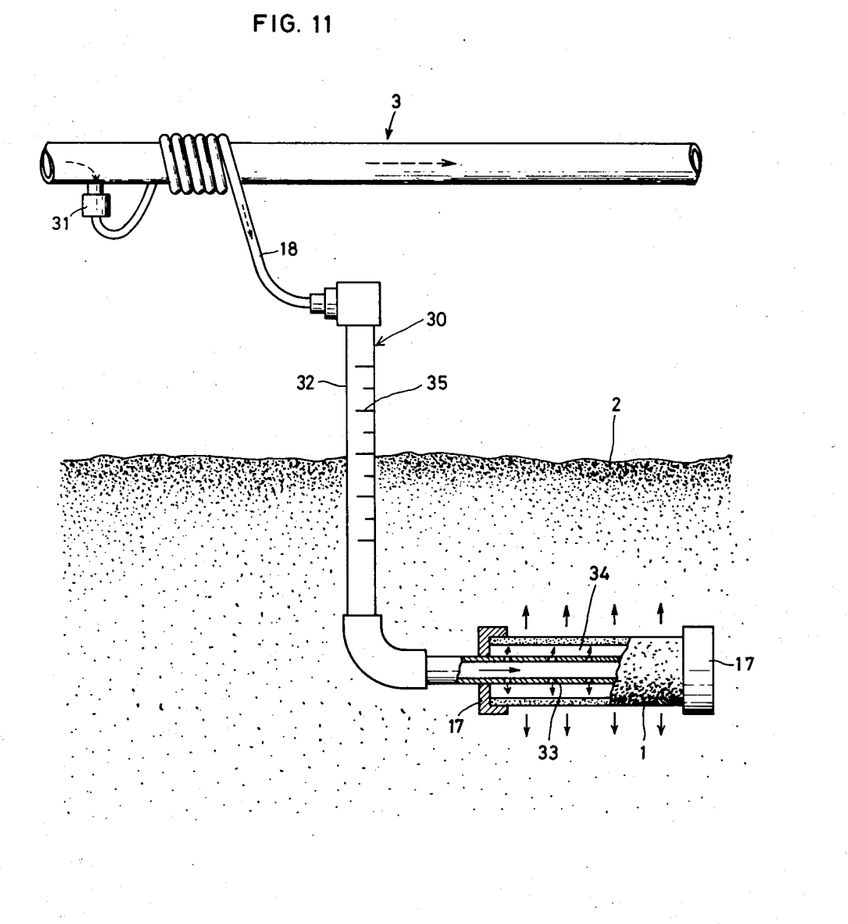
FIG. 11 is a partial sectional view showing another embodiment of the present invention.

Another possible embodiment is shown in FIG. 11. In this embodiment, the water feed pipe 3 is installed on or above the ground. The water permeable member 1 is tubular and the opposite ends thereof are sealingly closed by the closure members 17. The member 1 is connected to the pipe 3 through a branch pipe means 30. One end of the branch pipe means 30 is communicated with the pipe 3 by means of a suitable attachment 31 and the other end extends into the member 1. The branch pipe means 30 comprises a thin flexible tube 18 and a L-shaped rigid pipe 32. The lower end of the rigid pipe 32 extends into the member 1 through the closure member 17. That portion of the rigid pipe 32 which is located inside the member 1 is formed with a plurality of small bores 33 through which the water as fed from the pipe 3 enters into a space 34 between the inner surface of the member 1 and the outer surface of the rigid pipe 32 and gradually permeates through the wall of the member 1 into the cultivation soil 2. The rigid pipe 32 may be provided with a scale 35 which is convenient to determine the depth to which the member 1 is embedded. The thin flexible tube 18 and the L-shaped rigid pipe 32 are optional and the branch pipe means 30 may comprise a single plain pipe leading from the pipe 3 to the member 1. However, when a plurality of members 1 are connected to the pipe 3, the thin tubes 18 are effective to equalize the water pressure in these members 1 as described in connection with FIGS. 7 and 8. The L-shaped rigid pipe 32 is effective to indicate the position of the member 1 so that the plants may be planted in the best position relative to the member 1.

Figure 12:
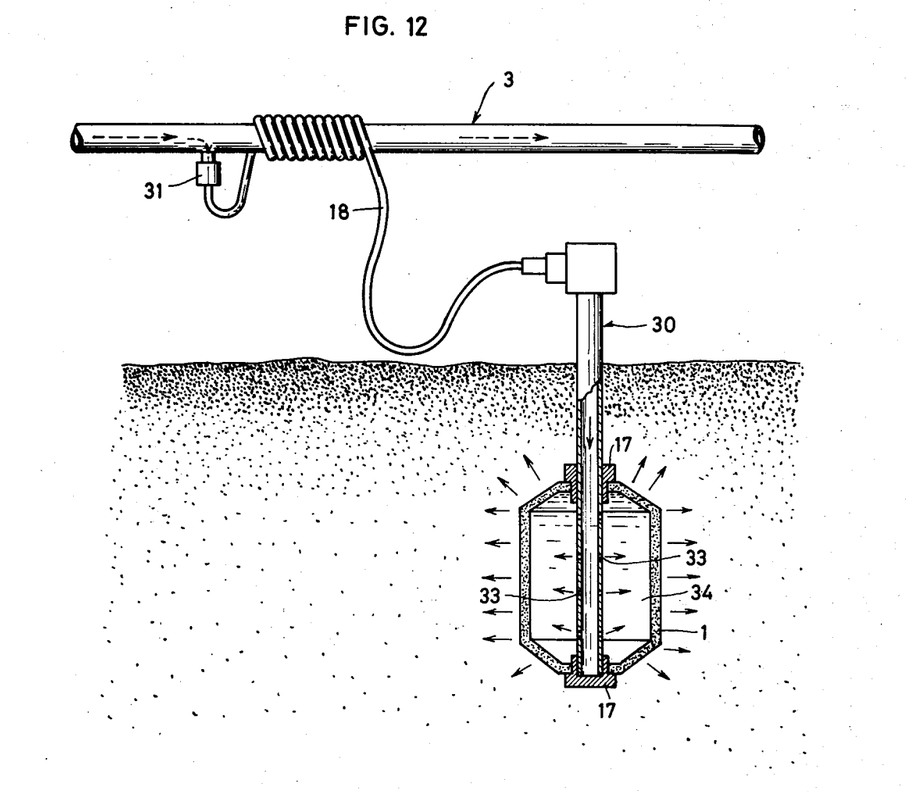
FIG. 12 is a partial sectional view showing a modification of FIG. 11.

A modification of the embodiment of FIG. 11 is shown in FIG. 12. This embodiment is different from that of FIG. 11 in that the member 1 is container shaped and is oriented vertically. This vertical orientation of the member 1 is well suited to be used for plants having roots which extend deep into the soil. Various approximate dimensions of the member 1 may be such that the wall thickness is 5–10 mm., the circumferential length 15–30 cm. and the length 10–30 cm.

Figure 13:
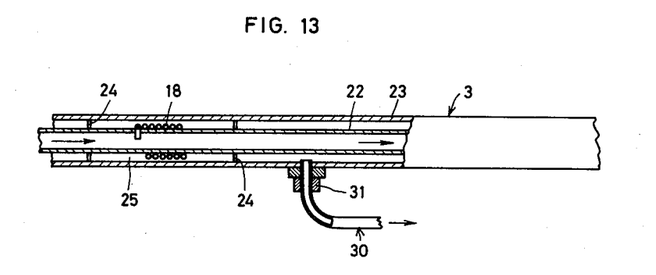
FIG. 13 is a partial sectional view showing a double wall water feed pipe which may be used in the embodiments of FIGS. 11 and 12.

As shown in FIG. 13, the double wall water feed pipe of FIG. 9 may be used also in the embodiments of FIGS. 11 and 12 for the same purpose. In this case, the water permeable members 1 are not inserted in the outer pipe 23, but the space 25 between the inner and outer pipes 22 and 23 is communicated with the members 1 through the respective suitable branch pipe means 30 which may or may not comprise the thin tube 18.

The water feed pipe 3 shown in FIG. 10 may also be used in the embodiments of FIGS. 11 and 12. In this case, selected ones of the water channels 26, 27, 28 and 29 are connected to a selected one or to a group of members 1 through suitable branch pipe means 30.

In all the embodiments described above the thin flexible tube 18 may be a plastic tube having an outer diameter of 5–10 mm. and an inner diameter of 1–6 mm. The length of such tube is determined depending on the water pressure drop to be produced thereby.

Though the embodiments of FIGS. 11, 12 and 13 have been described with the water feed pipe 3 installed on or above the ground, it will be easily understood that it may be embedded in the cultivation soil as is done in the preceding embodiments.

As stated hereinbefore, the soil is normally under underpressure and is liquid absorptive. Sometimes it is desirable to permeate the water through the water permeable member only by the water absorptivity to minimize the over-feed of water while still supplying the required amount of water to the roots of the plants. An embodiment well suited for this purpose is shown in FIG. 14.

Figure 14:
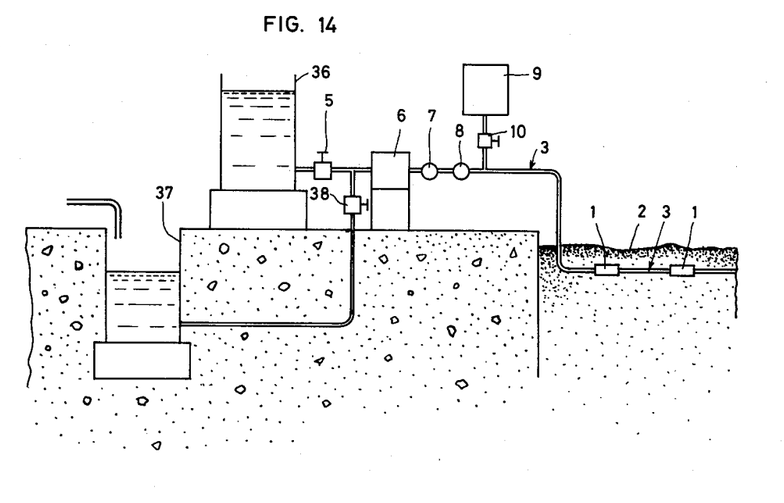
FIG. 14 is a sectional view similar to FIG. 1 but showing a still further embodiment of the present invention.

The water supply source in the embodiment of FIG. 14 comprises a high or positive pressure water tank 36 and a low or negative pressure water tank 37. The water level in the high pressure water tank 36 is maintained at a higher level than the water permeable members 1 to provide a positive water pressure, while the water level in the low pressure water tank 37 is maintained substantially at the same level as or lower than the members 1 to provide a negative pressure. These tanks 36 and 37 are switchable by means of the valves 5 and 38. Initially when the soil 2 is not sufficiently dampened, the valve 5 is opened while the valve 38 is closed so that water is supplied from the high pressure water tank 36 to the water feed pipe 3 to positively leak the water through the water permeable members 1 to rapidly and sufficiently dampen the soil 2. Thereafter, the valve 5 is closed and the valve 38 is opened to communicate the low pressure water tank 37 with the water feed pipe 3 so that the water spontaneously and gradually permeates through the water permeable members 1 only by the water absorptivity of the soil per se. With this arrangement, waste of water is further reduced so that it becomes possible to supply water to substantially farther locations as compared with the conventional arrangement. Such arrangement can be equally applied to any of the preceding embodiments. If desired the high pressure water tank 36 may be omitted.

As described above, according to the present invention, a water feed pipe connected to a suitable water supply source is embedded in the cultivation soil, and the water in the water feed pipe gradually permeates into the soil through a water permeable member having a number of fine capillary pores and is supplied to the cultivated plants. Therefore, the waste of water due to evaporation is considerably reduced while the plants are supplied the required amount of water, contributing to substantial saving of the water resorces. Furthermore, according to the present invention, contrary to the conventional drip irrigation system, the water supply is made through the entire large outer surface of the water permeable member so that it is possible to predominantly dampen the soil around the roots of the plants, resulting in promotion of growth of the plants and an increase of the yield. The problem of clogging of the drip unit in the prior drip irrigation system is not involved in the present invention. Since the water is supplied underground, the propagation of bacteria is suppressed.

While the principles of the present invention have been described above in connection with specific embodiments, and particular modifications thereof, it is to be clearly understood that this description is made only by way of example and not as a limitation on the scope of the invention. For instance the closure members 17 may be made of the same material as that of the hollow water permeable member 1 and made integral with the member 1. In this case, water tight sealing of the member 1 against the water feed pipe 3 or the branch pipe means 30 may be effected with a suitable sealing member interposed therebetween.

What is claimed is:

1. A method of performing undergound irrigation of soil, said method comprising:
    embedding in the soil at least one hollow water permeable member having a plurality of fine capillary pores in the wall thereof;
    providing a supply source of water maintained at a negative water pressure; and
    connecting said supply source of water to the interior of said water permeable member, and permeating water through said capillary pores of said water permeable member into the surrounding soil by means of a pressure difference between said negative water pressure of said supply source and a lower negative pressure within said soil resulting from the degree of absorptivity of said soil.

2. A method as claimed in claim 1, wherein said supply source of water is maintained at said negative water pressure by storing said water in a water supply tank and maintaining the level of said water in said tank substantially the same as or lower than the level of said water permeable member in said soil.

3. An underground irrigation system for performing underground irrigation of soil, said system comprising:
    at least one hollow water permeable member adapted to be embedded in soil, said water permeable member including a wall having therein a plurality of fine capillary pores;
    a supply source of water;
    means for maintaining said water at a negative water pressure; and
    at least one feed pipe means connecting said supply source of water to said water permeable member, for supplying water from said supply source to the interior of said water permeable member and for permeating said water through said capillary pores of said water permeable member into surrounding soil by means of a pressure difference between said negative water pressure of said supply source and a lower negative pressure within the surrounding soil resulting from the degree of absorptivity of the soil.

4. A system as claimed in claim 3, wherein said supply source of water comprises a water supply tank, and said negative water pressure maintaining means comprises level maintaining means for maintaining the level of said water in said water supply tank substantially the same as or lower than the level of said water permeable member in the soil.

* * * * *